United States Patent
Agrawal et al.

(10) Patent No.: US 12,116,527 B2
(45) Date of Patent: Oct. 15, 2024

(54) AQUEOUS GELLABLE COMPOSITION AND PIPELINE PIGS OBTAINED THEREFROM

(71) Applicant: Halliburton Energy Services, Inc., Houston, TX (US)

(72) Inventors: Amit Agrawal, Pune (IN); Giselle Braganza, Aberdeen (GB); Pratiksha Shivaji Meher, Pune (IN); Larry Steven Eoff, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 18/069,808

(22) Filed: Dec. 21, 2022

(65) Prior Publication Data

US 2024/0218233 A1 Jul. 4, 2024

(51) Int. Cl.
*C09K 8/52* (2006.01)

(52) U.S. Cl.
CPC ..................... *C09K 8/52* (2013.01)

(58) Field of Classification Search
CPC ............................................. C09K 8/52
See application file for complete search history.

(56) References Cited

U.S. PATENT DOCUMENTS

| 5,143,958 A | 9/1992 | Lockhart et al. |
| 5,300,152 A * | 4/1994 | Lowther ........... F16L 55/42 134/8 |
| 2006/0162928 A1 | 7/2006 | Collins et al. |
| 2011/0114318 A1 | 5/2011 | Ezell et al. |
| 2011/0257051 A1 * | 10/2011 | Welton ............. C09K 8/506 507/233 |
| 2012/0132422 A1 * | 5/2012 | Mirakyan ............ C09K 8/52 507/225 |
| 2015/0047843 A1 * | 2/2015 | Delheur ............. F17D 3/12 166/295 |
| 2018/0265761 A1 * | 9/2018 | Boul ............... C09K 8/5086 |
| 2022/0193737 A1 * | 6/2022 | Frerman ........... B05D 3/102 |

FOREIGN PATENT DOCUMENTS

| CN | 104259157 A * | 1/2015 | ......... B08B 9/055 |
| EP | 0630694 A2 | 12/1994 | |
| EP | 3676028 B1 | 3/2021 | |
| GB | 2397596 B | 10/2006 | |
| GB | 2538966 A * | 12/2016 | ......... C09K 8/524 |
| WO | 2003050387 A2 | 6/2003 | |

OTHER PUBLICATIONS

International Search Report and Written Opinion dated Feb. 20, 2024 for corresponding PCT Patent Application No. PCT/US2023/077712 filed on Oct. 25, 2023.

* cited by examiner

*Primary Examiner* — Kumar R Bhushan
(74) *Attorney, Agent, or Firm* — K&L Gates LLP

(57) ABSTRACT

The present disclosure is directed to an aqueous gellable composition that includes water; 10 to 45 composition wt. % of a crosslinkable water-soluble polymer including at least one functional group selected from the group of carboxylic acid and carboxylic acid derivative; 1 to 10 composition wt. % of an organic or inorganic crosslinking agent for the crosslinkable water-soluble polymer; 10 to 40 composition wt. % of a polyurethane polymer; and 0.1 to 5 composition wt. % of a natural polymer. The organic crosslinking agent includes at least one compound from the group of: polyalkyleneimines, polyalkylene polyamines, phenolic compounds combined with formaldehyde, and hydroquinone combined with hexamethylenetetramine. Also, the inorganic crosslinking agent includes at least one metal compound M, wherein M is from the group of: aluminum(III), chromium (III), iron(III), zirconium(III), and any mixture thereof.

16 Claims, No Drawings

AQUEOUS GELLABLE COMPOSITION AND PIPELINE PIGS OBTAINED THEREFROM

BACKGROUND

The volumetric efficiency of a pipeline may be diminished by the buildup of scale on the interior lining of the pipe. As such, mechanical pigs and/or gelled chemical pigs are frequently used for cleaning pipelines by removing that scale. Mechanical pigs are usually solid, bullet-shaped devices, which have wire brushes or abrasive surfaces to physically abrade the scale interior of the pipe. Conversely, gelled chemical pigs remove the surface deposits by dissolution and/or by picking up loose debris as they pass through the pipeline.

Certain pipelines, which are characterized by restricted access or egress points may not be best suited for the deployment of mechanical pigs. Further, in those pipelines which have short radius bends and which are of varying diameter—including but not limited to multi-bore pipelines—and in those pipelines which have significant scale build up presenting an internal obstruction, there is a risk that a mechanical pig may become stuck in the pipeline. This is extremely problematic should it occur and may be associated with high financial and time costs in recovering the pig and re-opening the pipeline. For such pipelines, it is thus attractive to use a gelled pig which may be deployed in the pipeline and which is capable of changing size to pass around obstructions or adapting to a different pipe diameter.

While gelled chemical pigs have thus found utility in pipelines for inter alia fluid displacement, debris removal and pipeline isolation operations, their use is not without problems. For example, issues with gelled chemical pigs have been observed in which: i) gelled pigs lack the abrasive power to remove stubborn deposits within the pipeline and may tear when contacting such deposits; ii) for large diameter pipelines, in particular those having a diameter greater than 60 cm (24 inches), the gelled pigs exhibit gravity-induced slumping; iii) gas trapped in the gelled pig compresses when the pig is subjected to pressure, decreasing its effective size and allowing the displacement fluid to bypass; iv) an open cell construction of the gelled pig permits the displacement fluid to flow through the gelled pig; and (v) plastic coatings, often disposed on the gelled pig to prevent fluid bypass, fail because the coatings do not form a seal at the pipeline wall. It would be desirable to develop gelled chemical pigs that do not suffer from these issues.

The above aside, it is noted that chemical gelled pigs are conventionally removed from pipelines by extrusion under pressure. The application of effective pressures for this purpose may not be viable for certain pipelines, in particular older pipelines or those of compromised integrity. It would in these circumstances be helpful to use a gelled chemical pig which is decomposed within the pipeline for removal. However, gelled pipeline pigs which may decompose at an effective rate but which may also retain functionality without slumping, tearing, or rupturing under tensile stress have not been identified in the art.

DETAILED DESCRIPTION

As used herein, the singular forms "a", "an", and "the" include plural referents unless the context clearly dictates otherwise.

When amounts, concentrations, dimensions, and other parameters are expressed in the form of a range, a preferable range, an upper limit value, a lower limit value, or preferable upper and limit values, it should be understood that any ranges obtainable by combining any upper limit or preferable value with any lower limit or preferable value are also specifically disclosed, irrespective of whether the obtained ranges are clearly mentioned in the context.

As used herein, the terms "about" or "approximately" apply to all numeric values, whether or not explicitly indicated. Accordingly, unless indicated to the contrary, the numerical parameters are approximations that may vary depending upon the desired properties of the present disclosure. As used herein, "about", "approximately", "substantially", and "significantly" will be understood by persons of ordinary skill in the art and will vary to some extent on the context in which they are used. If there are uses of the term which are not clear to persons of ordinary skill in the art given the context in which it is used, "about" and "approximately" will mean plus or minus 10% of the particular term and "substantially" and "significantly" will mean plus or minus 5% of the particular term.

Further, in accordance with standard understanding, a weight range represented as being "from 0 to x" specifically includes 0 wt. %: the ingredient defined by said range may be absent from the composition or may be present in the composition in an amount up to x wt. %.

The words "preferred", "preferably", "desirably", "optionally", and "particularly" may be used herein to refer to embodiments of the disclosure that may afford particular benefits, under certain circumstances. However, the recitation of one or more preferable, preferred, desirable, optional or particular embodiments does not imply that other embodiments are not useful and is not intended to exclude those other embodiments from the scope of the disclosure.

The word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

As used throughout this application, the word "may" is used in a permissive sense—that is meaning to have the potential to—rather than in the mandatory sense.

The term "plurality" as used herein, is defined as two or more than two.

As used herein, room temperature is 23° C. plus or minus 2° C.

The molecular weights referred to in this specification—to describe to macromolecular, oligomeric and polymeric components of the curable compositions—may be measured with gel permeation chromatography (GPC) using polystyrene calibration standards, such as is done according to ASTM 3536.

Where stated, the hydroxyl number is analyzed in accordance with according to the standard test method ASTM D4274-11.

Viscosities of the compositions described herein are, unless otherwise stipulated, measured using the Brookfield Viscometer at standard conditions of 20° C. and 50% Relative Humidity (RH). The method of calibration, the spindle type and rotation speed of the Brookfield Viscometer are chosen according to the instructions of the manufacturer as appropriate for the composition to be measured.

Tensile strength, as given herein, refers to the maximum tensile stress applied in stretching a specimen to rupture and is determined in accordance with ASTM D412-16(2021) *Standard Test Methods for Vulcanized Rubber and Thermoplastic Elastomers—Tension*. Tear strength as given herein is determined herein in accordance with ASTM D624-00

(2020) *Standard Test Method for Tear Strength of Conventional Vulcanized Rubber and Thermoplastic Elastomers.*

The term "mean particle size" ($d_{50}$), as used herein, refers to a particle size corresponding to 50% of the volume of the sampled particles being greater than and 50% of the volume of the sampled particles being smaller than the recited $d_{50}$ value.

The term "cylindrical" as used herein refers to a three-dimensional object that is obtained by taking a circular two-dimensional area and projecting it in one direction so that the resulting three-dimensional object has the same cross-sectional size and circular shape at any location along its length. The term "average diameter" has been employed herein ion define a substantially cylindrical pig to reflect the fact that some variance in diameter may be present along the longitudinal axis of the pig.

"Sensors" as referred to herein are devices that respond to a stimulus and communicate information about that stimulus. The stimulus may be any physical phenomenon, non-limiting examples of which include heat, light, pressure, electric or magnetic fields, motion, and changes in any of these over time or space.

The term "gellable composition" is used herein to refer to capability of the polymeric composition to form a hydrogel in response to initiation.

"Gelation" is a term used herein to describe the assembly of polymers dispersed in liquid which causes a transition from a liquid state to a gel-like state. The change in state, condition and/or structure of the gellable composition is initiated by: at least one ambient condition, such as temperature, pressure, moisture and irradiation; and/or the presence of a cross-linking agent or curative and optionally an accelerator. The formation of a three-dimensional polymeric network introduces features of increased stiffness, viscosity, elasticity and reduced pourability, and consequently is termed a "gel". The term "gelation" may be used interchangeably with terms such as "setting". Unless otherwise stated, the term is intended to encompass both partial as well as complete gelation. Complete gelation is herein deemed to have occurred when the compositions have developed a high enough yield stress to resist flow at ambient temperature for extended periods of time.

Broadly, "gel time" describes the time at which a mixture is substantially incapable of flow: in molecular terms, gel time references the point at which an infinite network is formed. As used hereinafter, the quantified "gel time" refers to the time at which a viscosity of 75000 centipoise is attained, said gel time of the composition being determined by Gardner Standard Model Gel Timers at a temperature of 25° C. and 50% Relative Humidity (RH).

As used herein, "pig" refers to a solid or semi-solid fluid-driven entity that is pumped through a pipeline from one point to another where launching and/or receiving facilities exist. In the present disclosure, it is preferred that the pig is formed as a unitary cylindrical body of substantially homogeneous material. The term "substantially homogeneous" refers to homogeneity at the macroscopic level: at a scale detectable to the human eye. The pig is characterized by the absence of visible phase separation, stratification, striations and discontinuities.

The term "natural polymer" is used herein to denote a polymer of natural origin, in particular polymers formed during the life cycles of plants, animals and microorganisms. The term here encompasses both polymers as extracted and purified from their original natural source and polymers which have been subsequently chemically or physically modified but which retain at least 50 wt. % of the molecular structure from the original natural source.

The term "polysaccharide" as used herein is a polymer comprising monosaccharide units—in particular aldose or ketose units having 5 or 6 carbon atoms—linked by glycosidic linkages. The polysaccharide may be a homo-polysaccharide or a hetero-polysaccharide, and may be linear or branched. Unless otherwise stated, any polysaccharide recited herein may be either unmodified or may be chemically modified subject to the condition that at least 50 wt. % of the molecular structure from the original naturally sourced polysaccharide is retained.

As used herein, the term "monomer" refers to a substance that may undergo a polymerization reaction to contribute constitutional units to the chemical structure of a polymer. The term "monofunctional", as used herein, refers to the possession of one polymerizable moiety. The term "polyfunctional", as used herein, refers to the possession of more than one polymerizable moiety.

As used herein, "(meth)acryl" is a shorthand term referring to "acryl" and/or "methacryl". Thus, the term "(meth)acrylate" refers collectively to acrylate and methacrylate.

As used herein, "$C_1$-$C_n$ alkyl" group refers to a monovalent group that contains 1 to n carbons atoms, that is a radical of an alkane and includes straight-chain and branched organic groups. As such, a "$C_1$-$C_{18}$ alkyl" group refers to a monovalent group that contains from 1 to 18 carbons atoms, that is a radical of an alkane and includes straight-chain and branched organic groups. Examples of alkyl groups include, but are not limited to: methyl; ethyl; propyl; isopropyl; n-butyl; isobutyl; sec-butyl; tert-butyl; n-pentyl; n-hexyl; n-heptyl; and 2-ethylhexyl. As used herein, such alkyl groups may be unsubstituted or may be substituted with one or more halogen. Where applicable for a given moiety (R), a tolerance for one or more non-halogen substituents within an alkyl group will be noted in the specification.

The term "$C_1$-$C_{18}$ hydroxyalkyl" as used herein refers to a HO-(alkyl) group having from 1 to 18 carbon atoms, where the point of attachment of the substituent is through the oxygen-atom and the alkyl group is as defined above.

An "alkoxy group" refers to a monovalent group represented by —OA where A is an alkyl group: non-limiting examples thereof are a methoxy group, an ethoxy group and an iso-propyloxy group. The term "$C_1$-$C_{18}$ alkoxyalkyl" as used herein refers to an alkyl group having an alkoxy substituent as defined above and wherein the moiety (alkyl-O-alkyl) comprises in total from 1 to 18 carbon atoms: such groups include methoxymethyl (—$CH_2OCH_3$), 2-methoxyethyl (—$CH_2CH_2OCH_3$) and 2-ethoxyethyl. Analogously, the term "$C_7$-$C_{18}$ alkoxyaryl" as used herein refers to an aryl group having an alkoxy substituent as defined above and wherein the moiety (aryl-O-alkyl) comprises in total from 7 to 18 carbon atoms.

The term "$C_2$-$C_4$ alkylene" as used herein, is defined as saturated, divalent hydrocarbon radical having from 2 to 4 carbon atoms.

The term "$C_3$-$C_{18}$ cycloalkyl" is understood to mean a saturated, mono- or polycyclic hydrocarbon group having from 3 to 18 carbon atoms. In the present disclosure, such cycloalkyl groups may be unsubstituted or may be substituted with one or more halogen. Where applicable for a given moiety (R), a tolerance for one or more non-halogen substituents within a cycloalkyl group will be noted in the specification. Examples of cycloalkyl groups include: cyclopropyl; cyclobutyl; cyclopentyl; cyclohexyl; cycloheptyl; cyclooctyl; adamantane; and norbornane.

As used herein, an "$C_6$-$C_{18}$ aryl" group used alone or as part of a larger moiety—as in "aralkyl group"—refers to monocyclic, bicyclic and tricyclic ring systems in which the monocyclic ring system is aromatic or at least one of the rings in a bicyclic or tricyclic ring system is aromatic. The bicyclic and tricyclic ring systems include benzofused 2-3 membered carbocyclic rings. In the present disclosure, such aryl groups may be unsubstituted or may be substituted with one or more halogen. Where applicable for a given moiety (R), a tolerance for one or more non-halogen substituents within an aryl group will be noted in the specification. Exemplary aryl groups include: phenyl; ($C_1$-$C_4$)alkylphenyl, such as tolyl and ethylphenyl; indenyl; naphthalenyl; tetrahydronaphthyl; tetrahydroindenyl; tetrahydroanthracenyl; and anthracenyl. And a preference for phenyl groups may be noted.

As used herein, "alkylaryl" refers to alkyl-substituted aryl groups and "substituted alkylaryl" refers to alkylaryl groups further bearing one or more substituents such as halo, nitro, cyano, amido, amino, sulfonyl, sulfinyl, sulfanyl, sulfoxy, urea, thiourea, sulfamoyl, sulfamide, and hydroxy. Further, as used herein "aralkyl" means an alkyl group substituted with an aryl radical as defined above.

The term "anhydrous" is intended to mean herein that the applicable composition, component or part comprises less than 0.25 wt. % of water, based on the weight of the mixture, component or part.

The present compositions may be defined herein as being "substantially free" of certain compounds, elements, ions or other like components. The term "substantially free" is intended to mean that the compound, element, ion, or other like component is not deliberately added to the composition and is present, at most, in only trace amounts which will have no (adverse) effect on the desired properties of the composition. An exemplary trace amount is less than 1000 ppm by weight of the composition. The term "substantially free" expressly encompasses those embodiments where the specified compound, element, ion, or other like component is completely absent from the composition or is not present in any amount measurable by techniques generally used in the art.

The term "simple salt" refers to a salt in which no hydrogen or hydroxyl is replaced by a metallic ion.

The present disclosure is directed to an aqueous gellable composition comprising a dispersion of a polyurethane polymer and a crosslinkable water-soluble polymer. More particularly, the present disclosure is directed an aqueous gellable composition comprising a polyurethane polymer, a cross-linkable water-soluble polymer, and a natural polymer. The gelled composition obtained therefrom may be cast as a pig which has utility in the displacement of fluid within, removing debris from inside, or isolating a portion of a pipeline containing.

The gellable composition of the present disclosure gels or sets to form a gelled product which demonstrates advantageous tear strength and tensile strength. Moreover, the gelled product—at least when provided in an unfrozen state—has an inherent flexibility which will enable its use as a pig within pipelines characterized by: having a variant diameter; and/or, having one or more bends and junctions (T-pieces).

The inclusion of natural polymers within the gellable composition and the gelled product obtained therefrom enables the in situ degradation of that product within a pipeline: pigs of the gelled product may thus be employed within pipelines which either do not have an egress point for pigs or have an egress point that is difficult or complex to access.

Crosslinkable Water-Soluble Polymer

The aqueous gellable composition of the present disclosure may comprise from 10 to 45 composition wt. %, based on the weight of the composition, of a crosslinkable water-soluble polymer comprising a functional group selected from the group consisting of carboxylic acid and a carboxylic acid derivative.

The carboxylic acid and carboxylic acid derivative is selected from the group consisting of: polyacrylamide or copolymer of polyacrylamide; acrylamide/t-butyl acrylate copolymer; alkyl acrylate polymer; 2-acrylamido-2-methylpropane sulfonic acid/acrylamide copolymers; sulfonated styrene/maleic anhydride copolymers; vinylpyrrolidone/2-acrylamido-2-methylpropane sulfonic acid/acrylamide terpolymers; 2-acrylamido-2-methylpropane sulfonic acid/N—N-dimethylacrylamide/acrylamide terpolymers; sulfonated styrene/maleic anhydride copolymer; vinyl pyrrolidone/2-acrylamido-2-methylpropane sulfonic acid/acrylamide terpolymer; 2-acrylamido-2-methylpropane sulfonic acid/N—N-dimethylacrylamide/acrylamide terpolymer; acrylic acid, methacrylic acid, acrylamide; t-butyl acrylate; alkyl acrylate, wherein alkyl is C1 to C30; 2-acrylamido-2-methylpropane sulfonic acid; sulfonated styrene; maleic anhydride; vinylpyrrolidone; and mixtures of any one of the foregoing monomers, copolymers, and terpolymers in any proportion thereof.

Polyacrylamide Polymer

More particularly, the gellable composition of the present disclosure may comprise from 10 to 45 wt. %, based on the weight of the composition, of at least one polyacrylamide polymer. Preferably the composition comprises from 15 to 30 wt. %, for example from 20 to 30 wt. % of at least one polyacrylamide polymer. The polyacrylamide polymer may be a homopolymer or a copolymer. Moreover, the polyacrylamide polymer may be linear or branched.

To be cross-linkable, the polyacrylamide polymer must possess pendant reactive groups. As such, the polyacrylamide may be characterized in that it comprises at least 50 wt. %, based on the total weight of monomers of at least one primary or secondary (meth)acrylamide monomer (AM1) as defined hereinbelow. For example, the polyacrylamide polymer may comprise from 70 to 100 wt. %, based on the total weight of monomers of the primary or secondary (meth)acrylamide monomers represented by formula (AM1).

In an embodiment, the crosslinkable water-soluble polymer may be a polyacrylamide polymer that has at least one of: a glass transition temperature (Tg) of from −30° C. to 60° C.; and a weight average molecular weight (Mw) of from 50000 to 1000000 daltons, for example from 50000 to 500000 daltons.

The polyacrylamide polymer of the present disclosure may, in some embodiments, be partially hydrolyzed, whereby a fraction of the pendant amide or, if present, ester groups of the polymer are hydrolyzed to form pendant acid groups. The degree of hydrolysis should not however exceed 30% of the acrylamide monomer units.

Primary and Secondary (Meth)Acrylamide Monomers

The polyacrylamide polymer may comprise at least 50 wt. %, based on the total weight of monomers of at least one primary or secondary (meth)acrylamide monomer represented by the following formula (AM1):

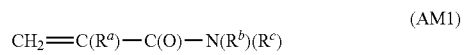

(AM1)

wherein:
R$^a$ is hydrogen or a C$_1$ alkyl group;
R$^b$ is hydrogen, C$_1$-C$_{12}$ alkyl, C$_1$-C$_{12}$ hydroxyalkyl, C$_3$-C$_{18}$ cycloalkyl or C$_6$-C$_{18}$ aryl; and
R$^c$ is hydrogen.

The polyacrylamide polymer may comprise from 50 to 100 wt. %, for example from 60 to 100 wt. % or from 70 to 100 wt. % based on the total weight of monomers of the primary or secondary (meth)acrylamide monomers.

In an embodiment of formula (AM1): R$^a$ is hydrogen or a methyl group; R$^b$ is hydrogen, C$_1$-C$_6$ alkyl, C$_1$-C$_6$ hydroxyalkyl, C$_3$-C$_{12}$ cycloalkyl or C$_6$-C$_{18}$ aryl; and R$^c$ is hydrogen. In particular, for formula (AM1): R$^a$ is hydrogen or a methyl group; R$^b$ is hydrogen, C$_1$-C$_4$ alkyl or C$_1$-C$_4$ hydroxyalkyl; and R$^c$ is hydrogen.

Exemplary monomers according to formula (AM1), which may be present alone or in combination, include: acrylamide; methacrylamide; N-methyl acrylamide; N-methyl methacrylamide; N-ethyl acrylamide; N-ethyl methacrylamide; N-propyl acrylamide; N-propyl methacrylamide; N-butyl acrylamide; N-butyl methacrylamide; N-hydroxyethyl acrylamide; N-hydroxyethyl methacrylamide; N-hydroxypropyl acrylamide; N-hydroxypropyl methacrylamide; N-(4-hydroxybutyl)acrylamide; and N-(4-hydroxybutyl methacryamide).

As noted above the polyacrylamide polymer(s) of the present composition may, in one or more embodiments, be a copolymer. In these embodiments, the copolymer may contain up to 50 wt. %, based on the total weight of monomers of at least one ethylenically unsaturated co-monomer. There is no particular intention to limit the constituent co-monomers from which the polyacrylamide polymer(s) is derived. However, it is preferable that any further ethylenically unsaturated monomers from which the polyacrylamide polymer is derived are in accordance with the definitions given herein below. More particularly, the use of (meth)acrylate ester monomers in accordance with the definitions given herein below is preferred.

Tertiary (Meth)Acrylamide Monomers

The polyacrylamide polymer may optionally comprise at least one tertiary (meth)acrylamide co-monomer represented by the following formula (AM2):

(AM2)

wherein:
R$^d$ is hydrogen or a C$_1$ alkyl group;
R$^e$ and R$^f$ are independently C$_1$-C$_{12}$ alkyl, C$_1$-C$_{12}$ hydroxyalkyl, C$_3$-C$_{18}$ cycloalkyl or C$_6$-C$_{18}$ aryl; or,
R$^e$ and R$^f$ together form a 5-10 member carbocyclic ring or a 5-10 member carbocyclic ring in which one or more of the carbon ring atoms is replaced with —O—, —S— or —NR$^g$—, wherein R$^g$ is hydrogen or a C$_{1-3}$ alkyl.

In one or more embodiments of the (meth)acrylamide monomer (AM2): R$^d$ is hydrogen or a methyl group; R$^e$ and R$^f$ are independently C$_1$-C$_6$ alkyl, C$_1$-C$_6$ hydroxyalkyl, C$_3$-C$_{12}$ cycloalkyl, or C$_6$-C$_{18}$ aryl; or, R$^e$ and R$^f$ together form a 5-7-member carbocylic ring or a 5-7 member carbocyclic ring in which one or more of the carbon ring atoms is replaced with —O—, —S— or —NR$^g$—, where R$^g$ is hydrogen or a C$_{1-3}$ alkyl. In other embodiments of the (meth)acrylamide monomer (AM2): R$^d$ is C$_1$-C$_4$ alkyl or C$_1$-C$_4$ hydroxyalkyl; and R$^e$ and R$^f$ together form a 5-7-member carbocyclic ring or a 5-7 member carbocyclic ring in which one or more of the carbon ring atoms is replaced with —O— or —S—. Exemplary monomers in accordance with formula (AM2) include: 4-acryloyl morpholine; and 4-methacryloyl morpholine.

Aliphatic and Cycloaliphatic (Meth)Acrylate Monomers

The polyacrylamide polymer may optionally comprise at least one (meth)acrylate co-monomer represented by formula (AM3)

(AM3)

wherein:
G is hydrogen, a halogen or a C$_1$ alkyl group; and
R$^1$ is selected from: C$_1$-C$_{30}$ alkyl; C$_1$-C$_{18}$ hydroxyalkyl; C$_2$-C$_{30}$ heteroalkyl; C$_3$-C$_{30}$ cycloalkyl; C$_2$-C$_8$ heterocycloalkyl; C$_2$-C$_{20}$ alkenyl; and C$_2$-C$_{12}$ alkynyl.

For example, R$^1$ may be selected from: C$_1$-C$_{18}$ alkyl, C$_1$-C$_{12}$ hydroxyalkyl; C$_2$-C$_{18}$ heteroalkyl, C$_3$-C$_{18}$ cycloalkyl; C$_2$-C$_8$ heterocycloalkyl; C$_2$-C$_8$ alkenyl, and C$_2$-C$_8$ alkynyl. Desirably, said monomer(s) are characterized in that R$^1$ is selected from C$_1$-C$_{18}$ alkyl, C$_1$-C$_6$ hydroxyalkyl and C$_3$-C$_{18}$ cycloalkyl.

Examples of (meth)acrylate monomers in accordance with formula (AM3) include but are not limited to: methyl (meth)acrylate; ethyl (meth)acrylate; butyl (meth)acrylate; hexyl (meth)acrylate; 2-ethylhexyl (meth)acrylate; dodecyl (meth)acrylate; lauryl (meth)acrylate; cyclohexyl (meth)acrylate; isobornyl (meth)acrylate; 2-hydroxyethyl (meth)acrylate (HEMA); 2-hydroxypropyl (meth)acrylate; ethylene glycol monomethyl ether (meth)acrylate; ethylene glycol monoethyl ether (meth)acrylate; ethylene glycol monododecyl ether (meth)acrylate; diethylene glycol monomethyl ether (meth)acrylate; trifluoroethyl (meth)acrylate; and perfluorooctyl (meth)acrylate.

In an embodiment of the disclosure wherein the composition comprises a polyacrylamide copolymer, (meth)acrylic monomers represented by formula (AM3) constitute at least 60 mole %, preferably at least 75 mole %, and more preferably at least 90 mole % of the total molar amount of ethylenically unsaturated monomers not conforming to formula (AM1) above.

Aromatic (Meth)Acrylate Monomers

The polyacrylamide polymer may optionally comprise at least one (meth)acrylate co-monomer represented by formula (AM4):

(AM4)

wherein:
Q may be hydrogen, a halogen or a C$_1$ alkyl group; and
R$^2$ may be selected from C$_6$-C$_{18}$ aryl, C$_1$-C$_9$ heteroaryl, C$_7$-C$_{18}$ alkaryl and C$_7$-C$_{18}$ aralkyl.

Exemplary (meth)acrylate monomers in accordance with formula (AM4)—which may be used alone or in combination—include but are not limited to: benzyl (meth)acrylate; phenoxyethyl (meth)acrylate; phenoxydiethylene glycol (meth)acrylate; phenoxypropyl (meth)acrylate; and phenoxydipropylene glycol (meth)acrylate.

In an embodiment of the disclosure wherein the composition comprises a polyacrylamide copolymer, (meth)acrylic monomers represented by formula (AM4) should constitute at most 40 mole %, preferably at most 25 mole %, and more preferably at most 10 mole % of the total molar amount of ethylenically unsaturated monomers not conforming to formula (AM1) above.

(Meth)Acrylate-Functionalized Oligomer

The polyacrylamide polymer may optionally comprise at least one (meth)acrylate functionalized oligomer selected from the group consisting of (meth)acrylate functionalized polyurethanes, (meth)acrylate-functionalized polyepoxide resins, (meth)acrylate-functionalized polybutadienes, (meth)acrylic polyol (meth)acrylates, polyester (meth)acrylate oligomers, polyamide (meth)acrylate oligomers, and polyether (meth)acrylate oligomers.

Said oligomers may have one or more acrylate and/or methacrylate groups attached to the oligomeric backbone, which (meth)acrylate functional groups may be in a terminal position on the oligomer and/or may be distributed along the oligomeric backbone. It is preferred that each (meth)acrylate functionalized oligomer be incorporated as a macromonomeric unit of the polyacrylamide: i) has two or more (meth)acrylate functional groups per molecule; and/or, ii) has a weight average molecular weight (Mw) of from 300 to 1000 daltons.

In an embodiment of the disclosure wherein the composition comprises a polyacrylamide copolymer, (meth)acrylic-functionalized oligomers should constitute at least most 40 mole %, preferably at most 25 mole % and more preferably at most 10 mole % of the total molar amount of the total molar amount of ethylenically unsaturated monomers not conforming to Formula (AM1) above.

Further Ethylenically Unsaturated Non-Ionic Monomers

The present disclosure does not preclude the presence of additional ethylenically unsaturated co-monomers not conforming to the definitions given herein. However, the presence of such further monomers in the polyacrylamide polymer should be constrained by the condition that said further monomers do not exceed 30 mole % of the total amount of monomers not conforming to Formula (AM1) above.

Such further ethylenically unsaturated monomers may include: α,β-monoethylenically unsaturated monocarboxylic acids; α,β-monoethylenically unsaturated dicarboxylic acids; $C_1$-$C_6$ alkyl half-esters of α,β-monoethylenically unsaturated dicarboxylic acids; α,β-monoethylenically unsaturated tricarboxylic acids; $C_1$-$C_6$ alkyl esters of α,β-monoethylenically unsaturated tricarboxylic acids bearing at least one free carboxylic acid group; ethylenically unsaturated sulfonic acids, such as vinylsulfonic acid, styrenesulfonic acid, and acrylamidomethylpropanesulfonic acid (AMSA); vinyl esters, such as vinyl acetate, vinyl propionate, and monomers of the VEOVA™ series available from Shell Chemical Company; vinyl and vinylidene halides; vinyl ethers such as vinyl ethyl ether; vinyl ketones including alkyl vinyl ketones, cycloalkyl vinyl ketones, aryl vinyl ketones, arylalkyl vinyl ketones, and arylcycloalkyl vinyl ketones; aromatic or heterocyclic aliphatic vinyl compounds; poly(meth)acrylates of alkane polyols, such as ethylene glycol di(meth)acrylate, propylene glycol di(meth)acrylate, butylene glycol di(meth)acrylate, neopentyl glycol di(meth)acrylate, hexylene glycol di(meth)acrylate, trimethylolpropane tri(meth)acrylate, glycerin tri(meth)acrylate, and pentaerythritol tetra(meth)acrylate; poly(meth)acrylates of oxyalkane polyols such as diethylene glycol di(meth)acrylate, dipropylene glycol di(meth)acrylate, triethylene glycol di(meth)acrylate, tetraethylene glycol di(meth)acrylate, dibutylene glycol di(meth)acrylate, di(pentamethylene glycol)dimethacrylate; polyethylene glycol di(meth)acrylates; and bisphenol-A di(meth)acrylates, such as ethoxylated bisphenol-A (meth)acrylate ("EBIPMA").

Representative examples of other ethylenically unsaturated polymerizable monomers include, without limitation: ethylene glycol dimethacrylate (EGDMA); fumaric, maleic, and itaconic anhydrides; monoesters; and diesters with $C_1$-$C_4$ alcohols such as methanol, ethanol, propanol, isopropanol, butanol, isobutanol, and tert-butanol. Representative examples of vinyl monomers include, without limitation, such compounds as: vinyl acetate; vinyl propionate; vinyl ethers, such as vinyl ethyl ether; and vinyl ethyl ketone. Representative examples of aromatic or heterocyclic aliphatic vinyl compounds include, without limitation, such compounds as styrene, α-methyl styrene, vinyl toluene, tert-butyl styrene, 2-vinyl pyrrolidone, 5-ethylidene-2-norbornene, and 1-, 3-, and 4-vinylcyclohexene.

For completeness, whilst the above-described co-polymerizable acid monomers may typically be used in the form of free acid; however, it is not precluded that the constituent acid groups of the monomers be partially or completely neutralized with suitable bases, provided this does not compromise their participation in co-polymerization.

The polyacrylamide polymer may be prepared from the starting monomers by an aqueous emulsion polymerization process in the presence of a water-soluble free-radical initiator and under appropriate heating. The polymerization medium may comprise water and water-miscible liquids, such as $C_1$-$C_4$ alkanols, but preferably consists only of water. The polymerization temperature may be in the range from 30° C. to 120° C., for example from 50° C. to 100° C.: that temperature need not be held constant but may, for example, be raised during the emulsion polymerization.

Suitable free radical initiators, which are conventionally used in an amount between 0.05 and 5 wt. % based on the total weight of monomers used, include: hydrogen peroxide; alkyl hydroperoxides, such as t-butylhydroperoxide and cumene hydroperoxide; persulphates, such as $NH_4$-persulphate, K-persulphate, and Na-persulphate; organic peroxides, such as acyl peroxides and including benzoyl peroxide; dialkyl peroxides, such as di-t-butyl peroxide; peroxy esters, such as t-butyl perbenzoate; and azo-functional initiators, such as azo-bis(isobutyronitrile) (AIBN), 2,2'-azo-bis(2-methyl butane nitrile) (ANBN), and 4,4'-azobis(4-cyanovaleric acid).

The aforementioned peroxy initiator compounds may in some cases be advantageously used in combination with suitable reductors to form a redox system. As suitable reductors, there may be mentioned: sodium pyrosulphite; potassium pyrosulphite; sodium bisulphite; potassium bisulphate; acetone bisulfite; hydroxymethane sulfinic acid; and isoascorbic acid. Metal compounds such as ferric EDTA (Fe(III)-EDTA) may also be usefully employed as part of the redox initiator system.

The person of ordinary skill in the art will be able to select an appropriate regimen for the addition of the initiator to the polymerization vessel in the course of the free radical aqueous emulsion polymerization. It may be introduced both completely into the polymerization vessel, or used continuously or in stages according to its consumption in the course of the free radical aqueous emulsion polymerization. Preferably, a part of the initiator is initially charged and the remainder supplied according to the consumption of the polymerization.

The aqueous polymerization is typically performed in the presence of from 0.1 to 5.0 wt %, based on the total weight of monomers, of emulsifier. Preferably non-ionic emulsifiers are employed, optionally in combination with anionic emulsifiers. As suitable non-ionic emulsifiers there may be mentioned linear or branched polyoxyethylene alcohols having from 5 to 50 ethylene oxide (EO) units. As suitable anionic emulsifiers, there may be mentioned $C_1$-$C_{18}$ alkane sulfates, $C_1$-$C_{18}$ alkane sulfonates, and phosphate esters.

In the emulsion polymerization, aqueous dispersions of the polymer are generally obtained with a solids content of greater than 60% by weight. Further, the polyacrylamide emulsion polymer should be obtained with a mono-modal particle size distribution characterized in that the average particle size ($d_{50}$) of the polymer particles in the aqueous dispersion is from 50 to 400 nm, for example from 50 to 200 nm. The aqueous dispersions of polyacrylamide—as obtained—may be further processed to separate the polyacrylamide or may, in one or more embodiments, be directly admixed with the further components of the gellable composition.

The above aside, exemplary commercial polyacrylamide polymers which may also have utility include: FDP-835™, HZ-30, and HZ-10 available from Halliburton Energy Services; Creagel® EZ 7 and EZ PFC, available from The Innovation Company (FR); CustoPoly® E-5 and 305 available from Custom Ingredients, Inc; Flocare™ T 920 GC available from SNF S.A.S. (FR); HallGel™ 305 available from The Hallstar Company; and Sepigel™ 305 and 501 available from Seppic Corporation Polymeric Cross-Linking Agent The aqueous gellable composition of the present application also comprises a crosslinking agent for the polyacrylamide polymer(s), the crosslinking agent comprising at least one compound selected from the group consisting of: polyalkyleneimines and polyalkylene polyamines. The aqueous gellable composition comprises, based on the weight of the composition, from 1 to 10 wt. %, for example from 1 to 5 wt. % of the crosslinking agent.

The crosslinking agent may be an organic or inorganic crosslinking agent. The organic crosslinking agent may comprise at least one compound selected from the group consisting of: polyalkyleneimines, polyalkylene polyamines, phenolic compounds combined with formaldehyde, and hydroquinone combined with hexamethylenetetramine. The phenolic compounds may comprise phenol or resorcinol.

The inorganic crosslinking agent may comprise at least one metal compound M, wherein M is selected from the group consisting of: aluminum(III), chromium(III), iron (III), zirconium(III), and any mixture thereof. The aluminum (III), chromium(III), iron(III), and zirconium(III) may be in a simple salt or a in a complex other than a simple salt. The complex may comprise, for example, aluminum triacetate, chromium triacetate, iron triacetate, or zirconium triacetate.

In one or more embodiments, the crosslinking agent may comprise or consist of at least one polymer selected from the group consisting of: poly($C_1$-$C_4$)alkyleneimines and poly($C_1$-$C_4$)alkylenepolyamines. More particularly, the crosslinking agent may comprise or consist of at least one polymer selected from the group consisting of: polyethyleneimine, polypropyleneimine, polyethylene polyamines, and polypropylene polyamines.

Exemplary polyethylene polyamines include but are not limited to: di ethylenetriamine, triethylenetetramine, and tetraethylenepentamine. An exemplary polypropylene polyamine is dipropylenetriamine.

The molecular weight of the polyethyleneimine may be adjusted to tune the gel formed by addition of the crosslinking agent. The polyethyleneimine may, in one or more embodiments, have a weight average molecular weight (Mw) of from 500 to 500000 daltons, for example from 500 to 100000 daltons, from 500 to 50000 daltons, or from 500 to 10000 daltons.

Polyurethane Emulsion Polymer

The composition of the present disclosure comprises an aqueous dispersion of at least one polyurethane polymer. The composition should comprise, based on the weight of the composition, from 10 to 40 wt. % of said at least one polyurethane polymer. For example, the composition may comprise from 15 to 30 wt. % or from 20 to 30 wt. %, based on the weight of the composition. The achievement of these constituent amounts of polyurethane polymer will be one determinant of the appropriate solids content of the aqueous dispersion.

In the alternative, suitable polyurethanes may be obtained from the reaction of: i) at least one polyol; ii) optionally further active hydrogen compounds; and iii) at least one polyisocyanate compound. As used herein "polyisocyanate" means a compound comprising at least two —N=C=O functional groups, for example from 2 to 5 or from 2 to 4 —N=C=O functional groups. Suitable polyisocyanates include aliphatic, cycloaliphatic, aromatic and heterocyclic isocyanates, dimers and trimers thereof, and mixtures thereof. To ensure that the polyurethane has no pendant isocyanate (NCO) groups, the equivalence of active hydrogen atoms to NCO groups of the reactants should be selected to ensure that no free NCO groups are present in the polyurethane: a molar ratio of active hydrogen atoms to isocyanate functional groups should therefore be at least 1:1, such as from 1.1:1 to 3:1 Or 1.1:1 to 2:1.

As used herein, "polyol" refers to any compound comprising two or more hydroxyl groups. The term is thus intended to encompass diols, triols, and compounds containing four or more —OH groups. Moreover, the at least one reactant polyol should herein be selected from the group consisting of: polyester polyols, polyether polyols, and polycarbonate polyols. The polyol should preferably have a number average molecular weight (Mn) of from 1000 to 50,000 g/mol, for example, from 1000 to 25,000 g/mol. Alternatively or additionally to this molecular weight characterization, the hydroxyl number of the reactant polyol should preferably be from 20 to 850 mg KOH/g, for example, from 25 to 500 mg KOH/g.

Polycarbonate diols may be obtained by reacting carbonic acid derivatives with diols. Exemplary carbonic acid derivatives are diaryl carbonates including but not limited to diphenyl carbonate, di($C_1$-$C_6$)alkyl carbonates, and phosgene. Exemplary diols include but are not limited to: ethylene glycol; 1,2-propanediol; 1,3-propanediol; 1,3-butanediol; 1,4-butanediol; 1,5-pentanediol; 1,6-hexanediol; cyclohexane dimethanol; diethylene glycol; dipropylene glycol; neopentylglycol; and mixtures thereof.

Polyester diols may be obtained by reacting diols with either aliphatic, aromatic or cycloaliphatic dicarboxylic acids or, in some circumstances, the corresponding anhydrides thereof: the reaction may optionally take place in the presence of an esterification catalyst. Examples of suitable dicarboxylic acids include but are not limited to: adipic acid; glutaric acid; pimelic acid; suberic acid; nonanedicarboxylic acid; decanedicarboxylic acid; succinic acid; maleic acid; sebacic acid; azelaic acid; terephthalic acid; isophthalic acid; o-phthalic acid; tetrahydrophthalic acid; hexahydrophthalic acid; trimellitic acid; and 1,4-cyclohexanedicarboxylic acid. Examples of suitable anhydrides include succinic, o-phthalic, and trimellitic anhydride. It is noted that various commercially available dimeric fatty acids in saturated (hydrogenated) or unsaturated form may also be used as the dicarboxylic acid. And examples of suitable diols for the preparation of the polyester diols are: ethanediol; di-, tri- or tetraethylene glycol; 1,2-propanediol; di-, tri-, tetrapropylene glycol; 1,3-propanediol; 1,4-butanediol; 1,3-butanediol; 2,3-butanediol; 1,6-hexanediol; 1,5-pentanediol; 2,2-dimethyl-1,3-propanediol (neopentylglycol); 1,4-dihydroxycyclohexane; 1,4-dimethylcyclohexane; 1,8-octanediol; 1,10-decanediol; 1,12-decanediol; 2,2,4- and/or 2,4,4-trimethyl-1,3-pentanediol; and mixtures thereof.

Other useful polyester diols are those obtainable from diol initiated polymerization of hydroxycarboxylic acids containing from 2 to 12 carbon atoms or a lactone thereof. The hydroxycarboxylic acids may be saturated or unsaturated, linear or branched, of which example include: glycolic acid; lactic acid; 5-hydroxy valeric acid; 6-hydroxy caproic acid; ricinoleic acid; 12-hydroxy stearic acid; 12-hydroxydodecanoic acid; 5-hydroxydodecanoic acid; 5-hydroxydecanoic acid; and. 4-hydroxydecanoic acid. Examples of suitable lactones are β-propiolactone, δ-valerolactone, $(C_1-C_6)$alkyl-valerolactone, ε-caprolactone, and $(C_1-C_6)$alkyl-ε-caprolactone.

The above aside, in one or more embodiments the polyol from which the polyurethane is derived is a polyether polyol, in particular a polyether polyol having a polydispersity (PD) of less than 2, preferably less than 1.5, and more preferably less than 1.3. For completeness, a "polyether" is understood for purpose of the present disclosure as a polymer whose repeating unit contains ether functionalities C—O—C in the main chain. Polymers having lateral ether groups, such as cellulose ethers, starch ethers, and vinyl ether polymers, as well as polyacetals, are therefore not covered by this definition. Desirably, the polyether polyol is a polyoxyalkylene and in particular a polyoxy$(C_2-C_3)$alkylene.

The presence of polyoxy$(C_2-C_3)$alkylene chains in the reactant polyol may act to internally stabilize the polyurethane in dispersion. This may minimize or obviate the need to include emulsifiers within the dispersion to provide external stabilization of the polyurethane.

It is noted that at least one monol may in some embodiments be employed in synthesizing the polyurethane as a further active hydrogen reactant ii). For example, a monofunctional hydrophilic polyoxyalkylene—such as polyoxyethylene or polyoxpropylene—may be incorporated into the polyurethane as a means of modifying the properties of the latex and improving its ease of emulsion formation. When present, the monol is present in an amount of from 0.1 to 5 wt. %, based on the weight of reactants i) to iii).

Aliphatic and cycloaliphatic polyisocyanates may comprise from 6 to 100 carbon atoms linked in a straight chain or cyclized and having at least two isocyanate reactive groups. Examples of suitable aliphatic isocyanates include but are not limited to straight chain isocyanates such as ethylene diisocyanate, trimethylene diisocyanate, tetramethylene diisocyanate, 1,6-hexamethylene diisocyanate (HDI), octamethylene diisocyanate, nonamethylene diisocyanate, decamethylene diisocyanate, 1,6,11-undecanetriisocyanate, 1,3,6-hexamethylene triisocyanate, bis(isocyanatoethyl)-carbonate, and bis (isocyanatoethyl) ether. Exemplary cycloaliphatic polyisocyanates include, but are not limited to, dicyclohexylmethane 4,4'-diisocyanate ($H_{12}$MDI), 1-isocyanatomethyl-3-isocyanato-1,5,5-trimethyl-cyclohexane (isophorone diisocyanate, IPDI), cyclohexane 1,4-diisocyanate, hydrogenated xylylene diisocyanate ($H_6$XDI), 1-methyl-2,4-diisocyanato-cyclohexane, m- or p-tetramethylxylene diisocyanate (m-TMXDI, p-TMXDI), and dimer fatty acid diisocyanate.

The term "aromatic polyisocyanate" is used herein to describe organic isocyanates in which the isocyanate groups are directly attached to the ring(s) of a mono- or polynuclear aromatic hydrocarbon group. In turn the mono- or polynuclear aromatic hydrocarbon group means an essentially planar cyclic hydrocarbon moiety of conjugated double bonds, which may be a single ring or may include multiple condensed (fused) or covalently linked rings. The term aromatic also includes alkylaryl. Typically, the hydrocarbon (main) chain includes 5, 6, 7 or 8 main chain atoms in one cycle. Examples of such planar cyclic hydrocarbon moieties include, but are not limited to, cyclopentadienyl, phenyl, napthalenyl-, [10]annulenyl-(1,3,5,7,9-cyclodecapentaenyl-), [12]annulenyl-, [8]annulenyl-, phenalene (perinaphthene), 1,9-dihydropyrene, and chrysene (1,2-benzophenanthrene). Examples of alkylaryl moieties are benzyl, phenethyl, 1-phenylpropyl, 2-phenylpropyl, 3-phenylpropyl, 1-naphthylpropyl, 2-naphthylpropyl, 3-naphthylpropyl, and 3-naphthylbutyl.

Exemplary aromatic polyisocyanates include, but are not limited to: all isomers of toluene diisocyanate (TDI), either in the isomerically pure form or as a mixture of several isomers; naphthalene 1,5-diisocyanate; diphenylmethane 4,4'-diisocyanate (MDI); diphenylmethane 2,4'-diisocyanate and mixtures of diphenylmethane 4,4'-diisocyanate with the 2,4' isomer or mixtures thereof with oligomers of higher functionality (so-called crude MDI); xylylene diisocyanate (XDI); diphenyl-dimethylmethane 4,4'-diisocyanate; di- and tetraalkyl-diphenylmethane diisocyanates; dibenzyl 4,4'-diisocyanate; phenylene 1,3-diisocyanate; and phenylene 1,4-diisocyanate.

The polyisocyanates, where required, may have been biuretized and/or isocyanurated by generally known methods. It is also noted that the term "polyisocyanate" is intended to encompass pre-polymers formed by the partial reaction of the aforementioned aliphatic, cycloaliphatic, aromatic, and heterocyclic isocyanates with polyols to give isocyanate functional oligomers, which oligomers may be used alone or in combination with free isocyanate(s).

To facilitate their inclusion in the compositions of the present disclosure, the at least one polyurethane polymer may be initially provided as a dispersion, the particles of which dispersion may desirably be characterized by a monomodal particle size distribution having a $d_{50}$ particle size of less than 1 micron, for example of from 50 to 400 nm. The size may be measured by dynamic light scattering.

The formation of a polyurethane dispersion in water may be achieved through: i) the first formation of a pre-polymer having free NCO groups from the aforementioned reactants under anhydrous conditions or in the presence of an organic solvent; and ii) the dispersion of the pre-polymer in the aqueous phase in either a continuous process of which high internal phase ratio (HIPR) process is an example or in a batch process of which an inverse phase process is an example. The reaction i) may be performed under catalysis and, for instance, at a temperature of from 25 to 100° C. The yielded pre-polymer should preferably be characterized by at least one of: i) an NCO content of from 5 to 30%, preferably from 10 to 25 wt. % based on the weight of the pre-polymer; ii) an NCO functionality of from 2.2 to 3.0, preferably from 2.2 or 2.4 to 2.9; iii) a viscosity at 20° C. of from 300 to 35,000 mPa·s, preferably from 1,000 to 10,000 mPa·s; and iv) a number average molecular weight (Mn) of from 500 to 30,000, for example from 500 to 15,000 or from 500 to 10,000 g/mol. For completeness, these characterizations i) to iv) are not intended to be mutually exclusive:

indeed, the pre-polymer may meet one, two, three, or four of these stated characterizations.

Standard polyurethane catalysts known in the art include: stannous salts of carboxylic acids, such as stannous octoate, stannous oleate, stannous acetate and stannous laureate; dialkyltin dicarboxylates, such as dibutyltin dilaureate and dibutyltin diacetate; tertiary amines; alkanolamine compounds; 2,3-dimethyl-3,4,5,6-tetrahydropyrimidine; tetraalkylammonium hydroxides; alkali metal hydroxides; alkali metal alcoholates; tin alkoxides, such as dibutyltin dimethoxide, dibutyltin diphenoxide and dibutyltin diisoproxide; tin oxides, such as dibutyltin oxide and dioctyltin oxide; the reaction products of dibutyltin oxides and phthalic acid esters; tin mercaptides; alkyl titanates; organoaluminum compounds such as aluminum trisacetylacetonate, aluminum trisethylacetoacetate, and diisopropoxyaluminum ethylacetoacetate; chelate compounds such as zirconium tetraacetylacetonate and titanium tetraacetylacetonate; organosilicon titanium compounds; bismuth tris-2-ethylhexanoate; acid compounds such as phosphoric acid and p-toluenesulfonic acid; triphenylborane; triphenylphosphine; 1,8-diazabicycloundec-7-ene (DBU); 1,5-diazabicyclo[4.3.0]non-5-ene; 1,4-diazabicyclo[2.2.2]octane; 4-dimethylaminopyridine; 1,5,7-triazabicyclo[4.4.0]dec-5-ene; 7-methyl-1,5,7-triazabicyclo[4.4.0]dec-5-ene; 1,8-bis(tetramethylguanidino)naphthalene; and 2-tert-butyl-1,1,3,3-tetramethylguanidine. Depending on the nature of the isocyanate, the amount of catalyst employed is typically in the range from 0.005 to 10% by weight of the mixture catalyzed.

As noted, the pre-polymer may optionally be made in the presence of a solvent and the solvent removed at least in part and preferably wholly either before or after the production of the aqueous dispersion. When a solvent is used, examples of solvents which are not reactive with the isocyanate include: ketones such as acetone and butanone; ethers such as tetrahydrofuran, dioxane, and dimethoxyethane; ether esters such as methoxypropyl acetate; (cyclic) amide and ureas such as dimethylformamide and dimethylacetamide; N,N'-dimethyl-2,5-dizapentanone; N-methylpyrrolidone; and capped glycol ethers. Such solvents may be added at any stage of the pre-polymer preparation.

It is preferred the aforementioned pre-polymers are extended with a chain extender. Typical chain extenders have a weight average molecular weight (Mw) of from 18 to 500 g/mol and have at least two active hydrogen containing groups. In particular, polyamines and/or water may be used as chain extenders with the mixture of water and polyamines being particularly preferred. As exemplary polyamines which may be used alone or in combination there may be mentioned: aminated polypropylene glycols such as Jeffamine D-400, available from Huntsman Chemical Company; hydrazine; piperazine; amino ethyl piperazine; 2-methyl piperazine; 1,5-diamino-3-methyl-pentane; isophorone diamine; ethylene diamine; diamino butane; hexane diamine; hexamethylene diamine; tetramethylene tetraamine; aminoethyl propyl trimethoxy silane; diethylene triamine; triethylene tetramine; triethylene pentamine; ethanolamine; and lysine.

Where a chain extender other than water—as the dispersion medium—is used in preparing the non-ionic polyurethane polymers of the present disclosure, the equivalence of the active hydrogen provided by the chain extender to the NCO groups of the pre-polymer should be selected to ensure that no free NCO groups are present in the final polyurethane as described above.

Natural Polymer

The compositions of the present disclosure comprise, based on the weight of the composition, may contain from 0.1 to 5 wt. % of at least one natural polymer. The composition may, in one or more embodiments, comprise from 0.1 to 2 wt. %, for example from 0.5 to 2 wt. % of the at least one natural polymer, based on the weight of the composition.

Exemplary natural polymers which have utility herein include but are not limited to: proteins, such as elastin, fibroin, sericin, fibrin and collagen; nucleic acids; and polysaccharides.

In one or more embodiments, the at least one natural polymer of the gellable composition comprises at least one polysaccharide. The at least one polysaccharide may be selected from the group consisting of: arabinoaxylans; cellulose; chitin; pectins; fructans, such as inulin and levan; galactogen; glycogen; starches, such as potato starch; proteoglycans; glycosaminoglycans, including hydraluronic acid; polygalactomannans, such as guar gum and locust bean gum; polygalactans, such as carrageenan gums; polyglucans, such as laminarin and xanthan gums; and polymannuronates, such as alginates.

In at least one embodiment, the at least one natural polymer of the gellable composition comprises at least one polysaccharide selected from the group consisting of: cellulose; starch; polygalactomannans; and polyglucans, or selected from the group consisting of: cellulose; guar gum; and xantham gum.

Exemplary cellulose-based polysaccharides include hydroxyethylcellulose, hydrophobically modified hydroxyethylcellulose, ethyl hydroxyethyl cellulose, hydrophobically modified ethyl hydroxyethyl cellulose, hydroxypropylcellulose and sodium carboxymethylcellulose. Such cellulose-based polysaccharides are available commercially including, for instance: BERMOCOLL™, available from AkzoNobel; and NATROLSOL™, KLUCEL™, and BLANOSE® available from Aqualon-Hercules.

Exemplary guar gum-based polysaccharides include: guar gum; hydroxy($C_1$-$C_6$)alkyl guars, such as hydroxyethyl guar, 2-hydroxypropyl guar gum and hydroxybutyl guar; carboxy($C_1$-$C_6$)alkyl guars, such as carboxymethyl guar, carboxylpropyl guar, carboxybutyl guar; and cationically modified guars such as guar gum 2-hydroxy-3-(trimethylammonium)propyl ether. In one or more embodiments, the or each guar gum polysaccharide included in the composition should be characterized by a number average molecular weight (Mn) of from 2500 to 500000 daltons, for example from 5000 to 250000 daltons.

Additives and Adjunct Ingredients

The gellable compositions of the present disclosure may in one or more embodiments further comprise adjuvants and additives that may impart improved properties to these compositions. For example, the adjuvants and additives may impart one or more of: improved elastic properties; improved elastic recovery; improved impact resistance; faster gel time; and lower residual tack. Included among such adjuvants and additives are: accelerators; plasticizers; stabilizers, including UV stabilizers; antioxidants; waxes; lubricants and boundary lubrication additives, such as random alkylene oxide copolymers and fatty acid ($C_{10}$-$C_{18}$) diethanolamide condensates; tackifiers; tougheners; drying agents; flame retardants; rheology modifiers; color pastes or color pigments, such as titanium dioxide, iron oxides or carbon black; solvents; and/or non-reactive diluents.

In addition, the aqueous gellable composition may further include colloidal silica. The colloidal silica may comprise LUDOX® AM colloidal silica, LUDOX® AS-40 colloidal silica, LUDOX® HS-40 colloidal silica, LUDOX® CL colloidal silica, LUDOX® LS colloidal silica, LUDOX® SM colloidal silica, LUDOX® AS-30 colloidal silica, LUDOX® TMA colloidal silica, LUDOX® HS-30 colloidal silica, LUDOX® TM-40 colloidal silica, LUDOX® CL-X colloidal silica, or LUDOX® TM-50 colloidal silica. The aqueous gellable composition may also include metal silicates. The metal silicates may include calcium silicate, aluminum silicate, or sodium silicate.

The term "accelerator" is intended herein to encompass any material which may reduce the gel time of the reactive composition. The accelerator may be of either the catalytic or reactive type. The present composition may comprise from 0 to 1 wt. %, for example from 0.01 to 0.5 wt. % of accelerator, based on the total weight of the composition. Exemplary accelerators include but are not limited to: alkali metal carbonates; alkali metal bicarbonates; alkali metal hydroxides; urea; mineral acids, such as hydrochloric acid; and Lewis acids, such as boric acid.

A "plasticizer" for the purposes of this disclosure is a substance that decreases the viscosity of the composition and thus facilitates its processability. Herein the plasticizer may constitute from 0 to 5 wt. % or from 0 to 2 wt. %, based on the total weight of the composition, and is preferably selected from the group consisting of: polydimethylsiloxanes (PDMS); diurethanes; ethers of monofunctional, linear or branched C4-C16 alcohols, such as Cetiol OE (obtainable from Cognis Deutschland GmbH, Dusseldorf); esters of abietic acid, butyric acid, thiobutyric acid, acetic acid, propionic acid esters and citric acid; esters based on nitrocellulose and polyvinyl acetate; fatty acid esters; dicarboxylic acid esters; esters of OH-group-carrying or epoxidized fatty acids; glycolic acid esters; benzoic acid esters; phosphoric acid esters; sulfonic acid esters; trimellitic acid esters; epoxidized plasticizers; polyether plasticizers, such as end-capped polyethylene or polypropylene glycols; polystyrene; hydrocarbon plasticizers; chlorinated paraffin; and mixtures thereof.

"Stabilizers" for purposes of this disclosure are to be understood as antioxidants, UV stabilizers or hydrolysis stabilizers. Herein stabilizers may constitute in toto from 0 to wt. % or from 0 to 2 wt. %, based on the total weight of the composition. Standard commercial examples of stabilizers suitable for use herein include: sterically hindered phenols; thioethers; benzotriazoles; benzophenones; benzoates; cyanoacrylates; acrylates; amines of the hindered amine light stabilizer (HALS) type; phosphorus; sulfur; and mixtures thereof.

Waxes represent an optional component of the present composition and may constitute from 0 to 5 wt. % or from 0 to 2 wt. %, based on the total weight of the composition. Without intention to limit the present disclosure, waxes having utility in the present disclosure should have a softening point of from 50 to 150° C. and may include one or more of: polyethylene having a number average molecular weight (Mn) from 500 to 7500; petroleum waxes, such as paraffin wax and microcrystalline wax; synthetic waxes made by polymerizing carbon monoxide and hydrogen, such as Fischer-Tropsch wax; polyolefin waxes including functionalized polyolefin waxes of which maleated polyethylene, maleated polypropylene, and maleated poly(ethylene-co-propylene) may be mentioned as examples; and hydrogenated animal, fish, or vegetable oils.

The present composition may optionally comprise one or more tackifiers which may be determinative of the contactability, bonding range, bond strength, heat resistance, and specific adhesion of the cured composition. When present, the total amount of tackifier should be up to 5 wt. %, for example up to 2 wt. %, based on the total weight of the composition. Without intention to limit the present disclosure, exemplary tackifiers, which may be used alone or in combination, include: rosin acids; rosin esters; terpene phenolic resins; hydrocarbon resins; and cumarone indene resins.

The compositions of the present disclosure may optionally contain a toughening rubber in the form of core-shell particles which are intended to become dispersed in the matrix obtained upon curing. The term "core shell rubber" or CSR is being employed in accordance with its standard meaning in the art as denoting a rubber particle core formed by a polymer comprising an elastomeric or rubbery polymer as a main ingredient and a shell layer formed by a polymer which is graft polymerized onto the core. The core shell rubber particles may be included in the composition in an amount of from 0 to 10 wt. %, for example from 1 to 5 wt. % based on the total weight of the composition.

It is preferred that any included core-shell rubber particles have an average particle size ($d_{50}$) of from 10 nm to 300 nm, for example from 50 nm to 200 nm. The particle size refers to the diameter or largest dimension of a particle in a distribution of particles and is measured via dynamic light scattering.

The core-shell rubber may be selected from commercially available products, examples of which include: Paraloid EXL 2650A, EXL 2655 and EXL2691 A, available from The Dow Chemical Company; Blendex particles, such as Blendex 338, available from Galata Chemicals; the KANE ACE® MX series available from Kaneka Corporation, and in particular MX 120, MX 125, MX 130, MX 136, MX 551, and MX553; and METABLEN SX-006 available from Mitsubishi Rayon.

As noted, the compositions according to the present disclosure may additionally contain a rheology modifier. The term "rheology modifier" denotes a compound or a mixture of compounds having utility in increasing one or more of the viscosity, the cohesion and the shear threshold of the composition. Rheology modifiers may further have an anti-bleeding effect.

The total amount of rheology modifier present in the compositions of the present disclosure may be from 0 to 30 wt. %, and more preferably from 0 to 20 wt. %, based on the total weight of the composition. The desired viscosity of the curable composition will typically be determinative of the total amount of rheology modifier added and it is submitted that in order to be readily injectable out of a suitable dispensing apparatus, the aqueous gellable compositions should possess a viscosity—immediately upon mixing—of from 3000 to 150,000 mPas.

Suitable herein as rheology modifiers are particulate inorganic fillers such as chalk, lime powder, precipitated silica, pyrogenic silica, zeolites, bentonites, magnesium carbonate, diatomite, alumina, clay, talc, titanium oxide, iron oxide, zinc oxide, sand, quartz, flint, mica, glass powder, and other ground mineral substances. Organic fillers may also be used in this context, in particular carbon black, graphite, wood fibers, wood flour, sawdust, cellulose, cotton, pulp, cotton, wood chips, chopped straw, chaff, ground walnut shells, and other chopped fibers. Short fibers such as glass fibers, glass filament, polyacrylonitrile, carbon fibers, Kevlar fibers, or polyethylene fibers may also be added. Aluminum powder is likewise suitable as a rheology modifier.

In order to enhance shelf life even further, it is often advisable to further stabilize the compositions of the present disclosure with respect to moisture penetration through using drying agents. A need also occasionally exists to lower the viscosity of a composition according to the present disclosure for specific applications, by using reactive diluent(s). The total amount of reactive diluents should be from 0 to 5 wt. %, for example from 0 to 2 wt. %, based on the total weight of the composition.

The presence of solvents and non-reactive diluents in the compositions of the present disclosure is also not precluded where this may usefully moderate the viscosities thereof. For instance, but for illustration only, the gellable compositions may contain one or more of: xylene; ethylene glycol dimethyl ether; ethylene glycol diethyl ether; ethylene glycol dibutyl ether; ethylene glycol diphenyl ether; diethylene glycol-monomethyl ether; diethylene glycol-monoethyl ether; diethylene glycol-mono-n-butyl ether; diethylene glycol dimethyl ether; diethylene glycol diethyl ether; diethylene glycoldi-n-butylyl ether; propylene glycol butyl ether; propylene glycol phenyl ether; dipropylene glycol monomethyl ether; dipropylene glycol dimethyl ether; dipropylene glycoldi-n-butyl ether; N-methylpyrrolidone; diphenylmethane; diisopropylnaphthalene; petroleum fractions such as SOLVESSO® products (available from Exxon); adipates; sebacates; phthalates; benzoates; organic phosphoric or sulfonic acid esters; and sulfonamides.

The above aside, it is preferred that the solvents and non-reactive diluents constitute in toto less than 10 wt. %, in particular less than 5 wt. % or less than 2 wt. %, based on the total weight of the composition.

Illustrative Embodiments of the Gellable Composition

In an illustrative embodiment of the present disclosure, there is provided an aqueous gellable composition that includes: water; from 15 to 30 composition wt. % of a polyacrylamide which comprises from 70 to 100 wt. %, based on the total weight of monomers of primary or secondary (meth)acrylamide monomers represented by formula (AM1):

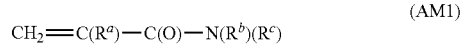
(AM1)

wherein: $R^a$ is hydrogen or a $C_1$ alkyl group;
$R^b$ is hydrogen, $C_1$-$C_{12}$ alkyl, $C_1$-$C_{12}$ hydroxyalkyl, $C_3$-$C_{18}$ cycloalkyl or $C_6$-$C_{18}$ aryl; and
$R^c$ is hydrogen;
from 1 to 5 wt. % of a crosslinking agent for the polyacrylamide polymer, the crosslinking agent comprising a polyethyleneimine having a weight average molecular weight (Mw) of from 500 to 50000 daltons; from 15 to 30 wt. % of a polyurethane polymer; and from 0.1 to 5 wt. % of a natural polymer selected from the group consisting of cellulose, guar gum and xantham gum.

Methods and Applications

The present disclosure is also directed to a method of pigging a pipeline. The method includes providing a gel pig into the pipeline, the gel pig comprising the gelled composition described herein, and providing at least one of displacing fluid within, removing debris from inside, or isolating a portion of the pipeline with the gel pig in the pipeline.

The method may further include conveying the gel pig through the pipeline with the gel pig in a frozen state.

The providing the gel pig into the pipeline may further include mixing the water, the polyacrylamide polymer, and the natural polymer in the presence of one or more gases under sufficient shear to homogeneously entrain the gases within the mixture; and chemically breaking down the gel pig in the pipeline.

The components of the gellable composition may be brought together and mixed in such a manner as to induce the gelation thereof. While not necessary, it may be pragmatic for the non-reactive components of the composition to be first mixed prior to the addition of the cross-linking agent to the mixture. Optionally the pre-mixed, non-reactive components may also be held for a duration of time before the addition of the cross-linking agent to allow the mixture to hydrate. In any event, any components should be mixed in the presence of an inert gas or an inert gaseous mixture—such as air—under sufficient shear both to entrain the gas(es) and to yield a homogeneous mixture. As any suitable high shear mixers may be used for this purpose, mention may be made of blade-style blenders and rotary impellers.

The entrained gas should form homogeneously distributed cells in the final material: the amount of entrained gas should be moderated such that the cells have an average diameter of less than 2 mm, for instance less than 1 mm or less than 0.5 mm.

The gelation of the compositions of the present disclosure may occur at temperatures in the range of from 10° C. to 180° C., preferably from 15° C. to 150° C., and in particular from 20° C. to 120° C. These ranges thereby include room temperature which may, in certain circumstances, be a desirable gelation temperature. The temperature that is suitable depends on the specific compounds present and the desired gel time and may be determined in the individual case by the skilled artisan, using tests if necessary. Where applicable, the temperature of the mixture formed from the respective components of the gellable composition may be raised above the mixing temperature using conventional means, including microwave induction.

Gelation is permitted to continue until the gelled composition is characterized by at least one of the following: a tear strength of from 0.01 to 1 kN/m, for example from 0.1 to 0.5 kN/m; a tensile strength of from 0.05 to 0.5 MPa, for example from 0.05 to 0.2 MPa; or a Young's modulus of from 0.05 to 0.25 MPa, for example from 0.05 to 0.20 MPa. These characterizations are not intended to be mutually exclusive of one another and one, two, or three thereof may be applicable.

The components of the gellable composition may also be selected such that the pig may be designed to have a specific density. In this manner, the gel pig may be made to float or sink to varying amounts depending on the fluid in the pipeline.

When the composition of the present disclosure is to be employed as a pipeline pig, the gellable composition is typically cast and/or formed into a desired shape. The homogenous mixture of all composition components is thus introduced—usually by injection under pressure—into a mold having an interior configuration corresponding to the desired exterior shape of the pig. The composition is retained in the interior of the mold for a sufficient time to effect the gelation of the composition. For example, a duration of from 10 to 120 minutes may be required.

The interior configuration of the mold will commonly be cylindrical or at least a substantially cylindrical. It is not however precluded that a mold of substantially cylindrical shape be pointed at one or both of its forward or rearward end. The pig cast from such a mold will thereby possess the point or points, which serve to reduce the contact angle of the pig—at its forward and/or its rearward end—with the internal wall of a pipeline into which is introduced. It is also not precluded that the internal surface of a substantially cylindrical mold be provided with projections or extensions along its length and/or circumferentially: these are intended to provide corresponding projections in the pig which will facilitate the positioning of the pig within a pipeline, in particular the co-axial positioning of the pig therein. These embodiments acknowledged, substantially cylindrical or cylindrical molds in accordance with the present disclosure may possess an average internal diameter of from 10 to 200 cm, in particular from 50 to 150 cm or from 50 to 100 cm.

In one or more embodiments, the mold may possess compressibility, by which is meant the internal volume of the mold may be reduced by, for example, up to 40 vol. %. For a cylindrical or substantially cylindrical mold, the mold may be compressible along at least a portion of the longitudinal axis of the cylinder, thereby reducing the diameter of the cylinder at that portion. When the volume of the mold is reduced with the gellable composition disposed therein, this serves to pressurize the gelled composition. Upon release from the mold into a space of larger volume, the gelled composition will expand; for example, the gelled composition may be moved from the mold into a cylindrical pipe of larger diameter than the mold and may expand to fill that pipe.

The mold into which the gellable composition is introduced may be heated: illustrative heating methods include, but are not limited to, applying heat directly to the exterior of the mold, employing heating elements which are embedded in the wall of the mold, or by disposing the mold in a heating chamber or oven maintained at a controlled temperature. For the present gellable composition, the mold may have a temperature of from 10 to 180° C., preferably from 15° C. to 150° C., and in particular from 20° C. to 120° C.

In advance of filling the mold, the interior thereof may be coated with a release agent. That aside, the contacting of the gellable composition with the optionally heated, interior walls of the mold will introduce some surface texture into the gelled composition. The surface texture will be caused by indentations formed by bubbles of the gas entrained in the gellable composition adhering to the interior surface of the mold. In addition to the composition of the gellable composition and the total volume of entrained gas, the temperature of the mold is also a determinant of the formation, size, and depth of the surface indentations.

In one or more embodiments, one or more functional elements—such as magnets, sensors and transmitters—may be disposed in the mold when the gellable composition is injected into the mold. Examples of sensors include magnetic sensors, proximity sensors, pressure sensors, ultrasonic sensors, accelerometers, radioactive (XRay). Examples of transmitters include acoustic, ultrasonic, magnetic, electromagnetic, radioactive. The sensors and transmitters may be battery powered, with the exception of magnetic and radioactive transmitters, which have inherent power. These elements thus become embedded in the gelled composition, forming a smart pig. The one or more embedded functional elements may be used to determine the condition of the pig and/or the inside surface of the pipeline into which the pig is introduced.

In one or more embodiments, the molded, gelled composition is removed from the mold. The pig may then be transported to its point of use and then launched into a pipeline using a conventional pig launcher. A period of storage between casting and use may be contemplated. Moreover, the pigs of the present disclosure may be stable when frozen. The pigs may therefore be frozen at, for example, a temperature of from −25 to 0° C. for storage, transport, and/or for deployment. In the latter circumstance, the pigs are initially disposed into the pipeline in the frozen state. Therefore, the gelled composition may be in a frozen state.

In one or more embodiments, the molded, gelled composition is transposed directly from the mold into the pipeline. Transferring the pig directly into the pipeline presents the advantage that no pig launcher is required. It is considered that the cast pig may be transposed to the pipeline in a partially gelled state and then allowed to fully gel within the pipeline. Finalizing the gelling of the pig in the pipeline permits the shape of the pig to correspond to the internal shape of the pipeline. Additionally, in this manner, the gel pig may be partially or completely formulated on-site at the pipeline.

It will be recognized that the pipeline to be cleaned with the pig may be subjected to a pre-operational treatment prior to the pig being disposed therein. Such treatments may include, but are not limited to, cleaning, passivation, and filling with water.

After the pig has been disposed in the pipeline, the pig may be driven through the pipeline by the driving force of a pressurized fluid. Where the operator wishes to leave the pipeline in a dry, empty state, the driving fluid may be a dry inert gas, such as nitrogen or carbon dioxide. Conversely, where the operator will refill the pipeline with a product, the pig could be driven with a liquid—such as crude oil or gasoline—with the caveat that the liquid should not adversely affect the properties of the pig before its job is complete or substantially complete.

The pigs and are pumped through the pipelines at pressures sufficient to move the pig at a reasonable rate. For example, a linear rate of from 0.1 to 5 $ms^{-1}$ may be viable for effective cleaning, with a linear rate of from 0.1 to 2 $ms^{-1}$ being more typical. As suitable pressures to achieve this rate, mention may be made of pressures of from 10 to 100 Bar, for example from 10 to 50 Bar.

The pigs of the present disclosure may be employed at a temperature of less than 60° C. At temperatures of from 20 to 60° C., the gelled composition may possess flexibility such that a cast pipeline pig thereof may pass through one or more of a bend, an obtuse-angled corner, a right-angled cornier, an acute-angled cornier, and a T-piece in a pipeline. Furthermore, the cast pig may pass through a pipeline of variant or irregular internal diameter and/or through a multibore; pipeline. As noted herein above, the pigs may in some embodiments be disposed within the pipeline in a frozen state. The typical application temperatures of such frozen pigs may be from −25 to 60° C., for example from −10 to 40° C. Under these conditions, the frozen pig may lack a high degree of flexibility until it thaws sufficiently. The pig in the frozen state will however possess greater abrasiveness compared to a non-frozen pig of the same composition and potentially the capacity to remove more stubborn deposits within the pipeline.

After passage through the pipeline, the pig may be recovered using a pig catcher. In an alternative embodiment the pig may be mechanically and/or chemically broken down inside the pipe. This may have the advantage that it avoids the need for a pig catcher and/or provides risk-free pigging of the pipeline in certain pipelines, in particular older pipelines or those of compromised integrity. For example, the pig may be chemically broken down inside the pipeline using any suitable gel breaker for well stimulation fluids. More particularly, such breakers may include, but are not limited to, peroxides, bleach, or sodium persulfate. The gel breaker may include internal a delayed gel breaker such as enzyme, oxidizing, acid buffer, or temperature-activated gel breaker. The gel break may also be temperature activated. The gel breaker cause the gellable composition to revert to a thin fluid that may be flowed out of the pipeline.

The pigs of the present disclosure may be used independently or as one element of a pig train in the pipeline cleaning process. The train may be constituted by more than pig in accordance with the present disclosure. Alternatively or additionally, the train may comprise one or more distinct chemical pigs and/or one or more mechanical pigs. In a multi-segment train, the operator may determine the appropriate number and appropriate order for different types of pigs disposed within the train.

It is envisaged that at least one mechanical pig—such as a scraper, swab, squeegee or spheres—could be employed within a train prior to the pig of the present disclosure. Such mechanicals pigs may operate to dislodge scale and debris which is subsequently picked up and carried by the pigs of the present disclosure. Further, when the driving force for the pig train is a gas under pressure, it may be beneficial—particularly in convoluted lines—to employ one or more squeegee pigs at the end of the pig train to help prevent fluid by pass.

Examples

The following commercial products were used in the Examples:

| | |
|---|---|
| HZ-30: | Polyacrylamide homopolymer, available from Halliburton |
| HZ-20: | Polyethyleneimine, available from Halliburton. |
| PUD: | Modified aliphatic polyurethane dispersion (35 wt. % solids) |
| WG-11: | Guar gum, available from Halliburton |
| WG-37: | Xanthan gum, available from Halliburton |

The aforementioned components were combined at the weights given in Table 1 herein below.

TABLE 1

| Component | Amount (g) |
|---|---|
| a) HZ-30 | 71 |
| b) HZ-20 | 4 |
| c) PUD | 25 |
| d-i) WG-11 | 0.6 |
| d-ii) WG-37 | 0.6 |

Components a), d-i) and d-ii) were hydrated in the aqueous polyurethane dispersion c) under high shear (1000 RPM). The obtained mixture was then allowed to stand for 1 hour for further hydration, after which time the crosslinking agent b) was added. The temperature of the obtained blend was maintained at 60° C. and permitted to gel.

Further examples of the present disclosure are as follows:

Example 1. An aqueous gellable composition comprising:
water;
10 to 45 composition wt. % of a crosslinkable water-soluble polymer comprising at least one functional group selected from the group consisting of carboxylic acid and carboxylic acid derivative;
1 to 10 composition wt. % of an organic or inorganic crosslinking agent for the crosslinkable water-soluble polymer, wherein:
(i) the organic crosslinking agent comprises at least one compound selected from the group consisting of: polyalkyleneimines, polyalkylene polyamines, phenolic compounds combined with formaldehyde, and hydroquinone combined with hexamethylenetetramine; and
(ii) the inorganic crosslinking agent comprises at least one metal compound M, wherein M is selected from the group consisting of: aluminum(III), chromium(III), iron(III), zirconium(III), and any mixture thereof;
10 to 40 composition wt. % of a polyurethane polymer; and
0.1 to 5 composition wt. % of a natural polymer.

Example 2. The aqueous gellable composition of Example 1, wherein the crosslinkable water-soluble polymer comprising at least one functional group selected from the group consisting of carboxylic acid and carboxylic acid derivative is selected from the group consisting of: polyacrylamide or copolymer of polyacrylamide; acrylamide/t-butyl acrylate copolymer; alkyl acrylate polymer; 2-acrylamido-2-methylpropane sulfonic acid/acrylamide copolymers; sulfonated styrene/maleic anhydride copolymers; vinylpyrrolidone/2-acrylamido-2-methylpropane sulfonic acid/acrylamide terpolymers; 2-acrylamido-2-methylpropane sulfonic acid/N—N-dimethylacrylamide/acrylamide terpolymers; sulfonated styrene/maleic anhydride copolymer; vinyl pyrrolidone/2-acrylamido-2-methylpropane sulfonic acid/acrylamide terpolymer; 2-acrylamido-2-methylpropane sulfonic acid/N—N-dimethylacrylamide/acrylamide terpolymer; acrylic acid, methacrylic acid, acrylamide; t-butyl acrylate; alkyl acrylate, wherein alkyl is C1 to C30; 2-acrylamido-2-methylpropane sulfonic acid; sulfonated styrene; maleic anhydride; vinylpyrrolidone; and mixtures of any one of the foregoing monomers, copolymers, and terpolymers in any proportion thereof.

Example 3. The aqueous gellable composition of Example 1, wherein the phenolic compounds comprise phenol or resorcinol.

Example 4. The aqueous gellable composition of Example 1, wherein aluminum(III), chromium(III), iron (III), and zirconium(III) are in a simple salt or a complex, and wherein the complex comprises aluminum triacetate, chromium triacetate, iron triacetate, or zirconium triacetate.

Example 5. The aqueous gellable composition of Example 1, wherein the crosslinkable water-soluble polymer is a polyacrylamide polymer that has at least one of a glass transition temperature (Tg) of from −30° C. to 60° C. or a weight average molecular weight (Mw) of from 50000 to 500000 daltons.

Example 6. The aqueous gellable composition of Example 1, wherein the crosslinkable water-soluble polymer is a polyacrylamide polymer comprising at least 50 wt. %, based on the total weight of monomers of a primary or secondary (meth)acrylamide monomer represented by the following formula (AM1):

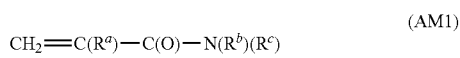

$$CH_2\!=\!\!=\!C(R^a)\!-\!C(O)\!-\!N(R^b)(R^c) \quad (AM1)$$

wherein:
$R^a$ is hydrogen or a $C_1$ alkyl group;
$R^b$ is hydrogen, $C_1$-$C_{12}$ alkyl, $C_1$-$C_{12}$ hydroxyalkyl, $C_3$-$C_{18}$ cycloalkyl or $C_6$-$C_{18}$ aryl; and
$R^c$ is hydrogen.

Example 7. The aqueous gellable composition of Example 6, wherein the polyacrylamide polymer comprises from 70 to 100 wt. %, based on the total weight of monomers of the primary or secondary (meth)acrylamide monomers represented by formula (AM1).

Example 8. The aqueous gellable composition of Example 6, wherein the polyacrylamide polymer further comprises a tertiary (meth)acrylamide co-monomer represented by the following formula (AM2):

$$CH_2=C(R^d)-C(O)-N(R^e)(R^f) \quad (AM2)$$

wherein:
$R^d$ is hydrogen or a $C_1$ alkyl group;
$R^e$ and $R^f$ are each independently $C_1$-$C_{12}$ alkyl, $C_1$-$C_{12}$ hydroxyalkyl, $C_3$-$C_{18}$ cycloalkyl or $C_6$-$C_{18}$ aryl; or
$R^e$ and $R^f$ together form a 5-10 member carbocyclic ring or a 5-10 member carbocyclic ring in which one or more of the carbon ring atoms is replaced with —O—, —S— or —NR$^g$—, wherein R$^g$ is hydrogen or a $C_{1-3}$ alkyl.

Example 9. The aqueous gellable composition of Example 6, wherein the polyacrylamide polymer further comprises a (meth)acrylate co-monomer represented by Formula (AM3):

$$H_2C=CGCO_2R^1 \quad (AM3)$$

wherein:
G is hydrogen, a halogen or a $C_1$ alkyl group; and
$R^1$ is selected from: $C_1$-$C_{30}$ alkyl, $C_1$-$C_{18}$ hydroxyalkyl, $C_2$-$C_{30}$ heteroalkyl, $C_3$-$C_{30}$ cycloalkyl, $C_2$-$C_8$ heterocycloalkyl, $C_2$-$C_{20}$ alkenyl, and $C_2$-$C_{12}$ alkynyl.

Example 10 The aqueous gellable composition of Example 1, wherein the crosslinking agent comprises at least one polymer selected from the group consisting of: poly($C_1$-$C_4$)alkyleneimines and poly($C_1$-$C_4$)alkylenepolyamines, or from the group consisting of: polyethyleneimine, polypropyleneimine, polyethylene polyamines, and polypropylene polyamines.

Example 11. The aqueous gellable composition of Example 1, wherein the organic crosslinking agent comprises a polyethyleneimine having a weight average molecular weight (Mw) of from 500 to 50000 daltons.

Example 12. The aqueous gellable composition of Example 1, wherein the polyurethane polymer is dispersed in the composition and has a mono-modal particle size distribution characterized in that the average particle size ($d_{50}$) of the polymer particles in the aqueous dispersion is from 50 to 400 nm.

Example 13. The aqueous gellable composition of Example 1, wherein the natural polymer comprises at least one polysaccharide selected from the group consisting of: cellulose, starch, polygalactomannans, and polyglucans, or selected from the group consisting of: cellulose, guar gum, and xantham gum.

Example 14. The aqueous gellable composition of Example 1, wherein the composition is gelled and the gelled composition has at least one of: a tear strength of from 0.01 to 1 kN/m; a tensile strength of from 0.05 to 0.5 MPa; or a Young's modulus of from 0.05 to 0.25 MPa.

Example 15. The aqueous gellable composition of Example 1, wherein the composition further comprises colloidal silica or a metal silicate.

Example 16. A pipeline pig comprising a gelled composition obtained from an aqueous gellable composition comprising:
water;
to 45 composition wt. % of a crosslinkable water-soluble polymer comprising at least one functional group selected from the group consisting of carboxylic acid and carboxylic acid derivative;
1 to 10 composition wt. % of an organic or inorganic crosslinking agent for the crosslinkable water-soluble polymer, wherein:
(i) the organic crosslinking agent comprises at least one compound selected from the group consisting of: polyalkyleneimines, polyalkylene polyamines, phenolic compounds combined with formaldehyde, and hydroquinone combined with hexamethylenetetramine; and
(ii) the inorganic crosslinking agent comprises at least one metal compound M,
wherein M is selected from the group consisting of: aluminum(III), chromium(III), iron(III), zirconium (III), and any mixture thereof;
10 to 40 composition wt. % of a polyurethane polymer; and
0.1 to 5 composition wt. % of a natural polymer.

Example 17. The pipeline pig of Example 16, wherein the crosslinkable water-soluble polymer comprises at least 50 wt. %, based on the total weight of monomers of a primary or secondary (meth)acrylamide monomer represented by the following formula (AM1):

$$CH_2=C(R^a)-C(O)-N(R^b)(R^c) \quad (AM1)$$

wherein:
$R^a$ is hydrogen or a $C_1$ alkyl group;
$R^b$ is hydrogen, $C_1$-$C_{12}$ alkyl, $C_1$-$C_{12}$ hydroxyalkyl, $C_3$-$C_{18}$ cycloalkyl or $C_6$-$C_{18}$ aryl; and
$R^c$ is hydrogen.

Example 18. The pipeline pig of Example 16, wherein the phenolic compounds comprise phenol or resorcinol.

Example 19. The pipeline pig of Example 16, wherein aluminum(III), chromium(III), iron(III), and zirconium(III) are in a simple salt or a complex, and wherein the complex comprises aluminum triacetate, chromium triacetate, iron triacetate, or zirconium triacetate.

Example 20. The pipeline pig of Example 16, wherein the gelled composition has at least one of:
a tear strength of from 0.01 to 1 kN/m;
a tensile strength of from 0.05 to 0.5 MPa; or
a Young's modulus of from 0.05 to 0.25 MPa.

Example 21. The pipeline pig of Example 20, wherein the gelled composition is in a frozen state.

Example 22. The pipeline pig of Example 16, wherein the gelled composition further comprises colloidal silica or a metal silicate.

Example 23. A method of pigging a pipeline, the method comprising:
providing a gel pig into the pipeline, the gel pig comprising a gelled composition comprising:
water;
to 45 composition wt. % of a crosslinkable water-soluble polymer comprising at least one functional group selected from the group consisting of carboxylic acid and carboxylic acid derivative;

1 to 10 composition wt. % of a an organic or inorganic crosslinking agent for the crosslinkable water-soluble polymer, wherein:
(i) the organic crosslinking agent comprises at least one compound selected from the group consisting of: polyalkyleneimines, polyalkylene polyamines, phenolic compounds combined with formaldehyde, and hydroquinone combined with hexamethylenetetramine; and
(ii) the inorganic crosslinking agent comprises at least one metal compound M, wherein M is selected from the group consisting of:
aluminum(III), chromium(III), iron(III), zirconium (III), and any mixture thereof;
10 to 40 composition wt. % of a polyurethane polymer; and
0.1 to 5 composition wt. % of a natural polymer; and
at least one of displacing fluid within, removing debris from inside, or isolating a portion of the pipeline with the gel pig in the pipeline.

Example 24. The method of Example 23, further comprising conveying the gel pig through the pipeline with the gel pig in a frozen state.

Example 25. The method of Example 23, further comprising:
wherein the crosslinkable water-soluble polymer is a polyacrylamide polymer;
forming the gel pig by mixing the water, the polyacrylamide polymer, and the natural polymer in the presence of one or more gases under sufficient shear to homogeneously entrain the gases within the mixture; and
chemically breaking down the gel pig in the pipeline.

Example 26. The method of Example 23, wherein the phenolic compounds comprise phenol or resorcinol.

Example 27. The method of Example 23, wherein aluminum(III), chromium(III), iron(III), and zirconium(III) are in a simple salt or a complex, and wherein the complex comprises aluminum triacetate, chromium triacetate, iron triacetate, or zirconium triacetate.

Example 28. The method of Example 23, wherein the gelled composition comprises at least one of:
a tear strength of from 0.01 to 1 kN/m;
a tensile strength of from 0.05 to 0.5 MPa; or
a Young's modulus of from 0.05 to 0.25 MPa.

Example 29. The method of Example 23, wherein the gelled composition further comprises colloidal silica or a metal silicate.

It should be understood that various changes and modifications to the example embodiments described herein will be apparent to those skilled in the art to which this disclosure pertains. Such changes and modifications may be made without departing from the spirit and scope of the present subject matter and without diminishing its intended advantages. It is therefore intended that such changes and modifications be covered by the appended claims. Also, it should be appreciated that the features of the dependent claims may be embodied in the compositions and methods of each of the independent claims.

What is claimed is:

1. A method of pigging a pipeline, the method comprising:
providing a gel pig into the pipeline, the gel pig comprising a gelled composition comprising:
water;
10 to 45 composition wt. % of a crosslinkable water-soluble polymer comprising at least one functional group selected from the group consisting of carboxylic acid and carboxylic acid derivative;
5.5 to 10 composition wt. % of an organic or inorganic crosslinking agent for the crosslinkable water-soluble polymer, wherein:
(i) the organic crosslinking agent comprises at least one compound selected from the group consisting of: polyalkyleneimines, polyalkylene polyamines, phenolic compounds combined with formaldehyde, and hydroquinone combined with hexamethylenetetramine; and
(ii) the inorganic crosslinking agent comprises at least one metal compound M, wherein M is selected from the group consisting of:
aluminum (III), chromium (III), iron (III), zirconium (III), and any mixture thereof;
10 to 40 composition wt. % of a polyurethane polymer; and
0.1 to 5 composition wt. % of a natural polymer; and
at least one of displacing fluid within, removing debris from inside, or isolating a portion of the pipeline with the gel pig in the pipeline.

2. The method of claim 1, further comprising conveying the gel pig through the pipeline with the gel pig in a frozen state.

3. The method of claim 1, further comprising:
wherein the crosslinkable water-soluble polymer is a polyacrylamide polymer; and
forming the gel pig by mixing the water, the polyacrylamide polymer, and the natural polymer in the presence of one or more gases under sufficient shear to homogeneously entrain the gases within the mixture; and
chemically breaking down the gel pig in the pipeline.

4. The method of claim 1, wherein aluminum (III), chromium (III), iron (III), and zirconium (III) are in a simple salt or a complex, and wherein the complex comprises aluminum triacetate, chromium triacetate, iron triacetate, or zirconium triacetate.

5. The method of claim 1, wherein the gelled composition comprises at least one of:
a tear strength of from 0.01 to 1 kN/m;
a tensile strength of from 0.05 to 0.5 MPa; or
a Young's modulus of from 0.05 to 0.25 MPa.

6. The method of claim 1, wherein the gelled composition further comprises colloidal silica or a metal silicate.

7. The method of claim 2, wherein the crosslinkable water-soluble polymer comprises at least one functional group selected from the group consisting of carboxylic acid and carboxylic acid derivative is selected from the group consisting of: polyacrylamide or copolymer of polyacrylamide; acrylamide/t-butyl acrylate copolymer; alkyl acrylate polymer; 2-acrylamido-2-methylpropane sulfonic acid/acrylamide copolymers; sulfonated styrene/maleic anhydride copolymers; vinylpyrrolidone/2-acrylamido-2-methylpropane sulfonic acid/acrylamide terpolymers; 2-acrylamido-2-methylpropane sulfonic acid/N—N-dimethylacrylamide/acrylamide terpolymers; sulfonated styrene/maleic anhydride copolymer; 2-acrylamido-2-methylpropane sulfonic acid/N—N-dimethylacrylamide/acrylamide terpolymer; acrylic acid, methacrylic acid, acrylamide; t-butyl acrylate; alkyl acrylate, wherein alkyl is C1 to C30; 2-acrylamido-2-methylpropane sulfonic acid; sulfonated styrene; maleic anhydride; vinylpyrrolidone; and mixtures of any one of the foregoing monomers, copolymers, and terpolymers in any proportion thereof.

8. The method of claim 2, wherein the crosslinkable water-soluble polymer is a polyacrylamide polymer comprising at least one of a glass transition temperature (Tg) of from −30° C. to 60° C. or a weight average molecular weight (Mw) of from 50000 to 500000 daltons.

9. The method of claim 2, wherein the crosslinkable water-soluble polymer is a polyacrylamide polymer comprising at least 50 wt. %, based on the total weight of monomers of a primary or secondary (meth)acrylamide monomer represented by the following formula (AM1):

$$CH_2\!=\!C(R^a)\!-\!C(O)\!-\!N(R^b)(R^c) \quad (AM1)$$

wherein:
$R^a$ is hydrogen or a $C_1$ alkyl group;
$R^b$ is hydrogen, $C_1$-$C_{12}$ alkyl, $C_1$-$C_{12}$ hydroxyalkyl, $C_3$-$C_{18}$ cycloalkyl or $C_6$-$C_{18}$ aryl; and
$R^c$ is hydrogen.

10. The method of claim 9, wherein the polyacrylamide polymer comprises from 70 to 100 wt. %, based on the total weight of monomers of the primary or secondary (meth)acrylamide monomers represented by formula (AM1).

11. The method of claim 9, wherein the polyacrylamide polymer further comprises a tertiary (meth)acrylamide co-monomer represented by the following formula (AM2):

$$CH_2\!=\!C(R^d)\!-\!C(O)\!-\!N(R^e)(R^f) \quad (AM2)$$

wherein:
$R^d$ is hydrogen or a $C_1$ alkyl group;
$R^e$ and $R^f$ are each independently $C_1$-$C_{12}$ alkyl, $C_1$-$C_{12}$ hydroxyalkyl, $C_3$-$C_{18}$ cycloalkyl or $C_6$-$C_{18}$ aryl; or
$R^e$ and $R^f$ together form a 5-10 member carbocyclic ring or a 5-10 member carbocyclic ring in which one or more of the carbon ring atoms is replaced with —O—, —S— or —NR$^g$—, wherein R$^g$ is hydrogen or a $C_{1-3}$ alkyl.

12. The method of claim 9, wherein the polyacrylamide polymer further comprises a (meth)acrylate co-monomer represented by Formula (AM3):

$$H_2C\!=\!CGCO_2R^1 \quad (AM3)$$

wherein:
G is hydrogen, a halogen or a $C_1$ alkyl group; and
$R^1$ is selected from: $C_1$-$C_{30}$ alkyl, $C_1$-$C_{18}$ hydroxyalkyl, $C_2$-$C_{30}$ heteroalkyl, $C_3$-$C_{30}$ cycloalkyl, $C_2$-$C_8$ heterocycloalkyl, $C_2$-$C_{20}$ alkenyl, and $C_2$-$C_{12}$ alkynyl.

13. The method of claim 2, wherein the crosslinking agent comprises at least one polymer selected from the group consisting of: poly($C_1$-$C_4$)alkyleneimines and poly($C_1$-$C_4$) alkylenepolyamines, or from the group consisting of: polyethyleneimine, polypropyleneimine, polyethylene polyamines, and polypropylene polyamines.

14. The method of claim 2, wherein the organic crosslinking agent comprises a polyethyleneimine having a weight average molecular weight (Mw) of from 500 to 50000 daltons.

15. The method of claim 2, wherein the polyurethane polymer is dispersed in the composition and comprises a mono-modal particle size distribution characterized in that the average particle size ($d_{50}$) of the polymer particles in the aqueous dispersion is from 50 to 400 nm.

16. The method of claim 2, wherein the composition is gelled and the gelled composition comprises at least one of:
a tear strength of from 0.01 to 1 kN/m;
a tensile strength of from 0.05 to 0.5 MPa; or
a Young's modulus of from 0.05 to 0.25 MPa.

* * * * *